United States Patent [19]

Higgins

[11] Patent Number: 4,958,330

[45] Date of Patent: Sep. 18, 1990

[54] WIDE ANGULAR DIVERSITY SYNTHETIC APERTURE SONAR

[75] Inventor: Francis J. Higgins, Panama City, Fla.

[73] Assignee: The United States of America as represented by the Secretary of the Navy, Washington, D.C.

[21] Appl. No.: 208,086

[22] Filed: Nov. 3, 1980

[51] Int. Cl.$^5$ ............................................. G01S 15/00
[52] U.S. Cl. ..................................................... 367/88
[58] Field of Search .................................. 367/88, 106

[56] References Cited

U.S. PATENT DOCUMENTS

| | | | |
|---|---|---|---|
| 3,585,578 | 6/1971 | Fischer, Jr. | 367/88 |
| 3,895,340 | 7/1975 | Gilmour | 367/88 X |
| 3,950,723 | 4/1976 | Gilmour | 367/88 X |
| 4,088,978 | 5/1978 | Gilmour | 367/88 |

Primary Examiner—Thomas H. Tarcza
Assistant Examiner—Daniel T. Pihulic
Attorney, Agent, or Firm—Harvey David; John Becker; Sol Sheinbein

[57] ABSTRACT

A side-looking sonar is provided with the wide angle acceptance characteristics of a wide receiving beam together with the high resolution of a narrow receiving beam, while retaining both echo and shadow detection capability, through the use of a plurality of transducers disposed at such angles that their respective narrow beams cross one another at a location between the transducers and the ranges of interest and the distal portions of the beams lie adjacent one another. Individual returns received from the beams as the sonar is moved along a path normal thereto are coherently combined and detected.

8 Claims, 1 Drawing Sheet

WIDE ANGULAR DIVERSITY SYNTHETIC APERTURE SONAR

BACKGROUND OF THE INVENTION

This invention relates generally to the field of sonar and more particularly to improvements in high resolution, side-looking sonars for use in locating and classifying underwater objects.

Operational real or physical aperture side-looking sonars have sought to achieve high resolution by the use of high frequencies to effect a small angular beamwidth and correspondingly small lateral resolution at a long range. The lateral resolution $\rho$ is given as $$\rho = \frac{R\lambda}{L}, \quad \text{(Equation 1)}$$

where R is the target range, $\lambda$ is the wavelength, and L is the length of physical aperture. The acceptance angle $\theta$ for a sonar is given by the relationships $$\theta = \frac{\lambda}{\rho} = \frac{L}{R}. \quad \text{(Equation 2)}$$

Side-looking physical aperture sonars typically operate at frequencies and have required a lateral resolution L that dictate an acceptance angle $\theta$ of only about 1° or less. Now, if a specularly reflecting target object, such as a man-made device having an elongate shape, has its major axis of reflection rotated so as lie outside the acceptance angle of the sonar, the likelihood of detection is materially reduced.

A sonar approach that has a large acceptance angle while still maintaining a lateral resolution comparable to current side-looking physical aperture sonars is that known as synthetic aperture sonar wherein a narrow side-looking beam is formed by transducer means on a vehicle moving along a path, and the returns received at a series of successive locations along that path are processed to provide signals representative of returns that would have been received by a long linear array of transducers at those locations. Thus, the effect of a large aperture and large acceptance angle are achieved. U.S. Pat. No. 4,088,978 to G. A. Gilmour is exemplary of such a sonar. In addition to signal processing to achieve the synthetic aperature effect due to linear forward motion of the transducer, additional complexities and limitations arise, including but not limited to those resulting from non-uniform, non-linear excursions of the vehicle from an ideal linear path of travel which degrades the detection capabilities below the theoretically high levels that would otherwise be attainable.

In some side-looking sonars of the fixed aperture variety, for example for bottom mapping purposes, the insonifying beam as well as the receiving beam is narrow in the direction of travel. When the supporting vehicle has a substantial forward speed, it has been found advantageous to skew the insonifying beam somewhat forwardly of the receiving beam so that in the time it takes the insonifying pulse to reach the target strip, the movement of the vehicle will bring the receiving beam to bear thereon. The application of such skew angles between transmitting and receiving beams is discussed in U.S. Pat. No. 3,585,578 to Raymond C. Fisher, Jr.

Other efforts to improve the likelihood of detection of small or poorly reflecting targets in side-looking sonars have included the use of electronic phasing of return signals outputs from segmented transducers so as to focus at particular ranges of interest as described in U.S. Pat. No. 3,950,723 to G. A. Gilmour, and the use of acoustic lenses to gather reflected energy and focus it on receiver transducers as exemplified in U.S. Pat. No. 3,895,340 to the same party.

Another prior art sonar technique for increasing object detection and classification involves the processing of return signals to detect the presence of acoustic shadows. An example of such in the side-looking sonar art is found in U.S. Pat. No. 4,030,096 to W. E. Stevens et al. It is considered desirable that improvements in side-looking sonar systems preserve or enhance the capability of using acoustic shadowing in target detection and classification.

SUMMARY OF THE INVENTION

With the foregoing in mind, it is a principal object of this invention to provide an improved side-looking sonar.

Another object of the invention is to provide a side-looking sonar having an expanded acceptance angle compared to a conventional physical aperture sonar.

Still another object is the provision of a side-looking sonar system for location of underwater objects, which system has good lateral resolution, is operable at relatively high frequencies, and is characterized by increased capability of detection of targets wherein reflective highlights are not oriented toward the sonar.

As yet another object, the invention aims to accomplish the foregoing through the provision of a plurality of narrow beam receiving transducers that are arranged at predetermined angles to one another so as to cooperate in the production of an enlarged aperture effect leading to increased likelihood of detection of objects having poor retroreflective qualities relative to the insonifying wavefront.

A further object of the invention is to improve the effective aperture in a high frequency sonar without materially degrading the acoustic shadow detection capability thereof.

The invention may be further said to reside in certain novel combinations, constructions, and arrangements of parts which cooperate to achieve the foregoing objects and advantages, as well as others which will become apparent from the following description of a presently preferred embodiment when read in conjunction with the accompanying drawings.

DESCRIPTION OF THE PREFERRED EMBODIMENT

Figure 1:
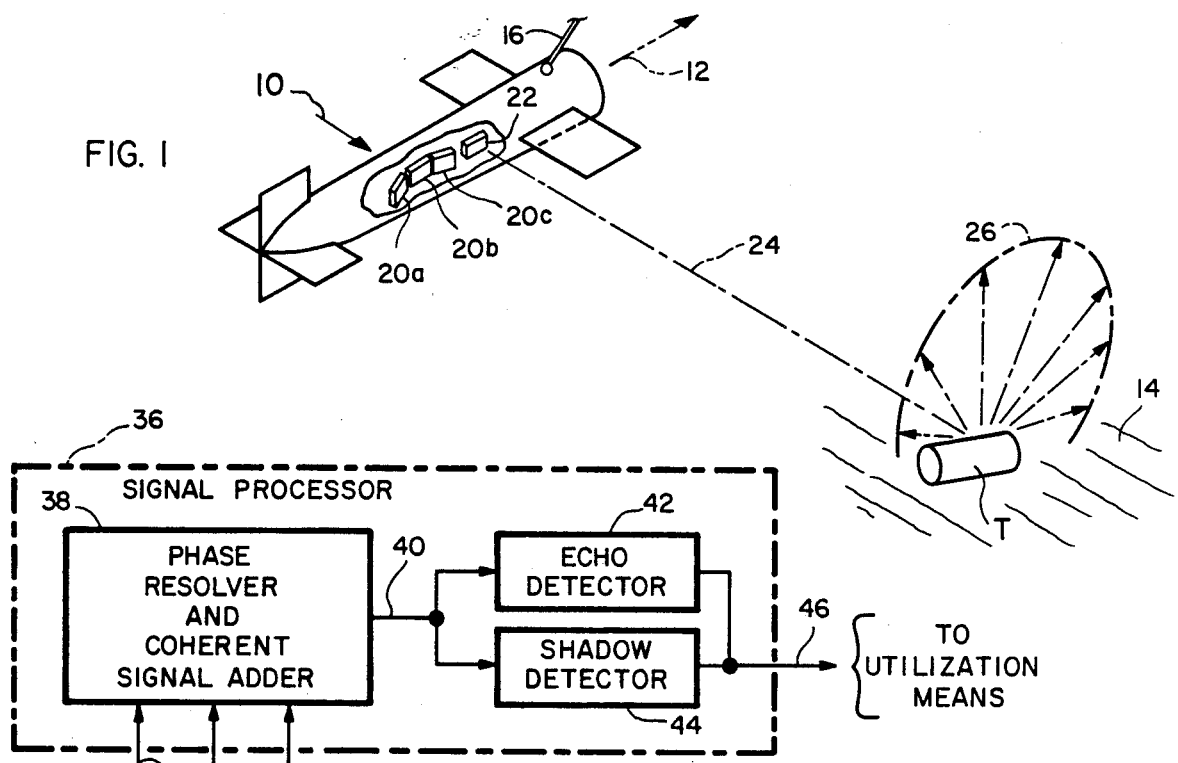
FIG. 1 is a perspective view of a towed side-looking sonar system vehicle embodying the present invention, with a portion broken away to reveal transducer components, and shown in relation to a typical target.

Referring now to FIG. 1, there is illustrated a towed vehicle 10 adapted to travel along a course or path of travel 12 parallel to and at a predetermined height above the bottom 14 of a body of water. The vehicle 10 houses side-looking sonar apparatus for the detection of targets, such as at T, and is towed by a suitable cable 16 from a surface or airborne tow craft (not shown). The cable 16 conveniently also provides a telemetering connection between the vehicle and the tow craft.

The side-looking sonar includes a plurality of electro-acoustic transducers 20a, 20b, and 20c arranged along the hull of the vehicle 10 and having a predetermined angular relation to one another for receiving target reflected acoustic energy, or echoes, in a manner that will presently be made apparent. Insonification of the target is accomplished in this example by energizing a separate projecting transducer 22 to direct acoustic pulses along an axis 24 substantially normal to the path of travel 12, or may be accomplished by energizing one or more of the transducers 20a, 20b, and 20c. In either event, the wavefront impinging on the target T, which presents no directly retroreflective surfaces, results in a relatively small portion of the energy being redirected in the direction of the vehicle 10, as shown by the vector envelope 26.

Figure 2:
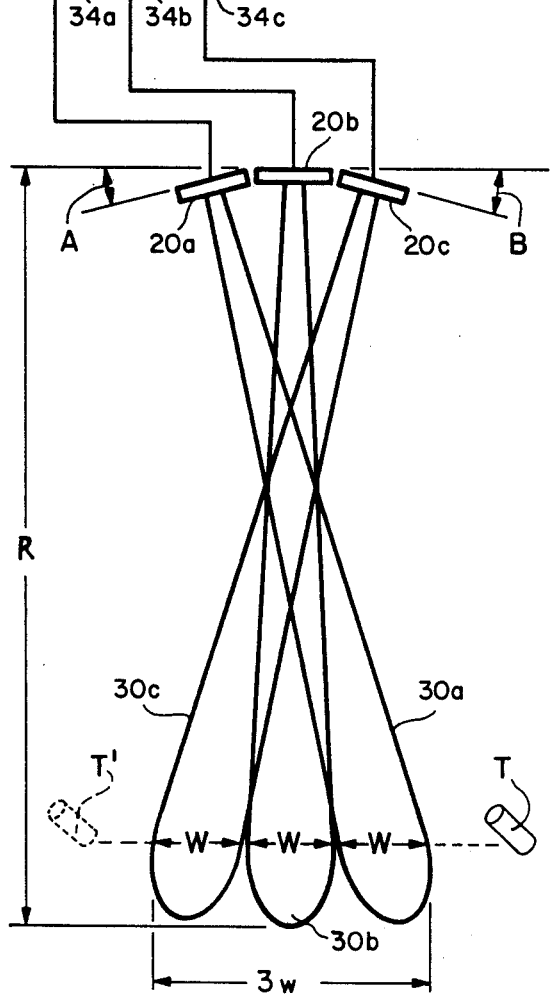
FIG. 2 is a dragrammatic illustration substantially in plan showing the relationship of the target with a plurality of sonar beams of the system of FIG. 1 during forward movement.

Referring now to FIG. 2, each of the receiving transducers 20a, 20b, and 20c, are constructed in accordance with well known principles to form one of a plurality of relatively narrow response beams 30a, 30b, and 30c. The beams illustrated are, for the sake of clarity, confined to the principal lobes, the side lobes being relatively insignificant. While not illustrated to scale, it may be assumed that the beams 30a, 30b, and 30c are each on the order of 1° in beamwidth W.

The transducer 20b is disposed so as to direct its beam 30b substantially abeam of the vehicle 10, keeping in mind that all of the beams conveniently have somewhat fan shaped vertical dimensions and are depressed somewhat from the horizontal. The transducer 20a is canted in azimuth relative to the transducer 20b, and in this example to the longitudinal axis and path of travel of the vehicle 10, by an angle A that is sufficient to direct the beam 30a forwardly so as to cross the beam 20b at a location intermediate the origin and the maximum range of the sonar and so as to lie ahead of and adjacent to, the beam 30b in ranges of interest at or near the maximum range R of the sonar. The angle A is approximately twice the beamwidth W. The transducer 20c is canted in the opposite direction relative to the transducer 20b by an angle B that is sufficient to direct the beam 30c rearwardly so as to cross the beam 30b at a location intermediate the origin and maximum range of the sonar and so as to have the distal portions of the beam 30c lying to the rear of and adjacent to the beam 30b. The angle B is also approximately twice the beamwidth W. It will be understood by those skilled in the art to which the invention pertains that the range R is determined, at least in part, by the repetition rate of the sonar and speed of sound in the water medium.

In operation, consider the target T in FIG. 2 to be at a range close to the maximum range R. of the sonar. As the vehicle 10 progresses along the path 12, the relative motion between the transducers 20a, 20b, and 20c and the target T will result in an apparent motion of the target from the full line position thereof along track 32 to the phantom position T' thereof. Thus, the target will be successively scanned by the beam 30a, the beam 30b, and the beam 30c and the target will therefore be in one or another of the receiving beams for a cumulative time period corresponding to a single beam of width 3W.

The electrical output signals of the transducers 20a, 20b, and 20c are represented by the lines 34a, 34b, and 34c and are applied as independent inputs to a signal processor 36. The signal processor 36 comprises conventional phase resolving and coherent signal adder means 38 which operates on the individual beam signals 34a, 34b, 34c, to generate a combined synthetic aperture beam return signal, line 40, having the return data of all three of the beams. Such processing is well known in the synthetic aperture sonar art as evidenced by the aforementioned U.S. Pat. No. 4,088,978.

The combined return signal 40 may then be subjected to detection processing, as by a target echo detector 42 and/or a shadow detector 44 to provide target echo and shadow signals collectively indicated by line 46 as the detected signal output of the signal processor 36, that output being suitable for application to utilization means such as sonar image display, recorder, alarm, control device, or the like. Such detection processing and utilization is well known in sonar systems, for example in the aformentioned U.S. Pat. No. 4,030,096.

Because the return from each beam 30a, 30b, 30c is received independently, the system has better target resolution capability than with a single 3° wide beam, and yet at the same time provides the advantage of a wide aperture substantially equal to that characteristic of a 3° beam.

Figure 3:
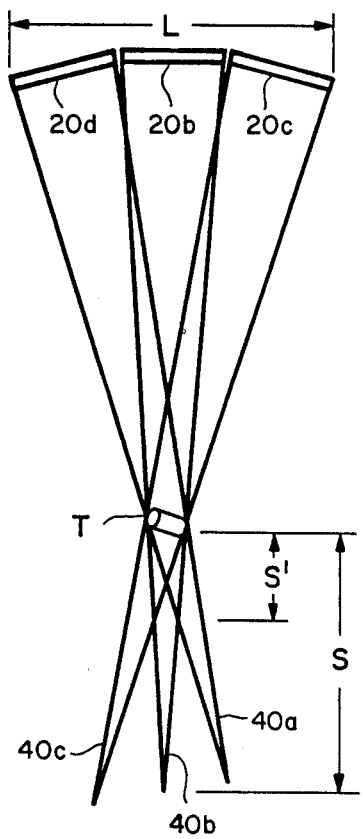
FIG. 3 is a diagrammatic illustration showing target shadow effects of the system.

Referring now to FIG. 3, there are diagrammatically illustrated the resolved shadow effects 40a, 40b, and 40c of the three independent beams 30a, 30b, and 30c of the receiving transducers 20a, 20b, and 20c, respectively. The depth of individual shadows is indicated at S. Now, it could be expected that a receiving transducer array having a real aperture L, corresponding to the effective or synthetic aperture of this apparatus, would result in a foreshortening of the shadow to a depth substantially as indicated at S'. If such were the case one could expect a substantial degradation of the sonar capability to utilize acoustic shadow detection, as well as echo detection, as indication of object presence, size, and other classification parameters. Apparently, because of the individuality of beam detection and coherent combination, it has been found in modeled tests that no significant degradation of acoustic shadow detection actually occurs, and that this fact, together with the increased effective aperture for echo returns, provides the basic for an improved high resolution side-looking sonar meeting the aforementioned objects and advantages.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A side-looking sonar apparatus comprising:
   vehicle means for travel along a path of forward movement;
   a plurality of electro-acoustic transducers carried by said vehicle and each adapted to generate a plurality of electrical signals corresponding to received acoustic energy reflected within corresponding ones of a plurality of response beams each having a narrow fore-and-aft dimension;
   said transducers being disposed at small angles relative to one another, whereby said beams cross one another at an intermediate location between their origin and the maximum range of said apparatus, and the distal portions of said beams lie adjacent to one another, whereby an object in the range of said distal positions is swept successively by said beams; and signal processing means, responsive to said plurality of electrical signals, for combination thereof to provide output signals characteristic of the presence of said objects.

2. Apparatus as defined in claim 1, and wherein:

said plurality of transducers comprise at least first and second transducers, said beams comprise at least first and second beams each having an angular beamwidth W;

one of said transducers being so disposed that the corresponding one of said beams is directed substantially abeam of said vehicle; and another of said transducers is canted in azimuth relative to said one of said transducers by about 2W so that the corresponding beam crosses said one of said beams and has a distal portion lying adjacent to the distal portion of said one of said beams.

3. Apparatus as defined in claim 1, and wherein:

said plurality of transducers comprises first, second, and third transducers, said beams comprise first, second, and third beams each having an angular beamwidth W;

said first transducer being so disposed that said first beam is directed substantially abeam of said vehicle, said second and third transducers are disposed fore and aft of said first transducer and are canted at small angles thereto so that said second and third beams cross said first beam and each other at said intermediate location.

4. In a side-looking sonar apparatus including means for projecting an insonifying pulse of acoustic energy into a predetermined zone, transducer means including a plurality of transducer segments adapted to receive portions of said acoustic energy returned from a corresponding plurality of predetermined narrow response beams and to provide a plurality of electrical signals representative of such received energy, the improvement characterized by:

said transducer segments being angularly disposed relative to one another so that said reception beams cross one another at an intermediate location between the transducer means and the distal portions of said beams and said distal portions lie adjacent to one another so that, upon forward motion of said apparatus along a path of travel substantially normal to said beams, an object between said intermediate location and the maximum range of said apparatus will be swept sequentially by said distal portions.

5. In side-looking sonar apparatus, the improvement as defined in claim 4, and further comprising:

signal processing means, responsive to said received energy, for detecting characteristics thereof indicative of the presence of said object.

6. In a side-looking sonar apparatus, the improvement as defined in claim 5, and wherein said signal processing means comprises:

means for coherently combining said plurality of electrical signals to provide a combined response signal;

object echo detecting means, responsive to said combined response signal, for generating a first output signal representative of coherently combined object echo components of said received energy.

7. In a side-looking sonar apparatus, the improvement as defined in claim 6, and wherein said signal processing means comprises:

object acoustic shadow detecting means, responsive to said combined response signal, for generating a second output signal representative of a combination of acoustic shadow characteristics of each of said plurality of beams.

8. In a side-looking sonar apparatus, the improvement as defined in claim 7, and wherein:

said plurality of transducer segments comprises first, second, and third electroacoustic transducers, said beams comprise first, second, and third beams each having a relatively narrow azimuthal beamwidth, said beams extending substantially laterally of said path of travel, and said means for projecting said insonifying pulse of acoustic energy comprises a projecting transducer so oriented that insonification of said said predetermined zone occurs in predetermined timed relation to scanning thereof by said beams.

* * * * *